United States Patent [19]

Patel

[11] Patent Number: 5,691,067
[45] Date of Patent: Nov. 25, 1997

[54] NON-STICK/RELEASE POWDER COATINGS FOR COOKWARE AND BAKEWARE

[75] Inventor: Rajendra Patel, Schaumburg, Ill.

[73] Assignee: Coatings America, Inc., Chicago, Ill.

[21] Appl. No.: 695,664

[22] Filed: Aug. 8, 1996

Related U.S. Application Data

[63] Continuation-in-part of Ser. No. 429,204, Apr. 26, 1995, abandoned.
[51] Int. Cl.$^6$ .................................................. C08F 283/12
[52] U.S. Cl. ........................ 428/447; 525/934; 525/477; 525/104; 106/287.15; 524/904; 524/588
[58] Field of Search ........................ 525/934, 477, 525/104; 428/447; 106/287.15; 524/904, 588

[56] References Cited

U.S. PATENT DOCUMENTS

| | | | |
|---|---|---|---|
| 4,066,817 | 1/1978 | De Rossi | 428/339 |
| 4,098,756 | 7/1978 | Miller et al. | 260/42.27 |
| 4,169,117 | 9/1979 | Vasta | 525/150 |
| 4,369,279 | 1/1983 | Emerick | 524/267 |
| 4,417,006 | 11/1983 | Graziano et al. | 523/435 |
| 4,537,800 | 8/1985 | Kuziemka | 427/327 |
| 4,544,692 | 10/1985 | Kuziemka | 524/361 |
| 4,623,565 | 11/1986 | Huybrechts et al. | 428/35 |
| 4,681,908 | 7/1987 | Broderick et al. | 525/477 |
| 4,778,860 | 10/1988 | Morita et al. | 525/431 |
| 4,895,766 | 1/1990 | Saad | 428/447 |

OTHER PUBLICATIONS

Dow Corning "Information about Silicone Resins", DC 6–2230 resin, 1989.
Journal of Paint Technology, "Powder Coating: Why—How—When", Smarsh, pp. 30–37, 1971.
Helma Jotischky, World Powder Coating Market, "Powder coatings: The marketing conundrum," *Powder Coating*, pp. 47–55, Feb. 1994.
Coatings Performance Materials Data Sheet, Modaflow® Powder III, Publication No., 8125B.
Typical Properties of Zeeospheres®, Zeelan Industries Inc., 1989.
Degussa Corporation, Hydrophobic Fumed Silicas Summary Technical Data Sheet.
Synthron Incorporated, Technical Bulletin Modarex SI-21-91.
Dow Corning Corporation, Information About Silicone Resins, Dow Corning® 6–2230 Resin.
OMG Metal Specialty Chemicals For Industry, 8% Zinc Hex–Cem, Code 809.
Technical Bulletin Shell Chemical Company, EPON® Resin 2002, SC: 235–84.202, Sep. 1989.
Ferro, Color Data, F–6331 Inorganic Pigment (Black).
Nyco Technical Data, Nyad® 400 Wollastonite, Moderate Aspect Ratio Grade.
Wacker Silicone, Resins SME 10–165.8210, Wacker Silicone Intermediate SY 430.
Ciba–Geigy, Plastics Department, Product Data, HT 9690 Hardener for Powder Coatings and Molding Compounds.
Ciba–Geigy, Plastics Division, Product Data, ECN 1235, 1273, 1280, 1299, Novolac Epoxy Resins.
Material Safety Data Sheet, for Product Code 110–007–65.
Kraft Chemical Company, Micro–Mica™.

*Primary Examiner*—Margaret W. Glass
*Attorney, Agent, or Firm*—Banner & Witcoff, Ltd.

[57] ABSTRACT

The present invention comprises powdered coatings for cookware to improve the non-stick and/or release characteristics at elevated temperatures. Specifically, the powdered coatings comprise a solid silicone resin that is heat resistant and an siloxane additive, with or without polytetrafluoroethylene. In the preferred embodiment of the present invention, the silicone resin is methyl phenyl silicone or phenyl silicone or methyl polysiloxane or phenyl alkyl polysiloxane resin and the additive is either methyl alkyl polysiloxane or dimethyl polysiloxane.

16 Claims, No Drawings

NON-STICK/RELEASE POWDER COATINGS FOR COOKWARE AND BAKEWARE

This application is a continuation-in-part of application Ser. No. 08/429,204, filed Apr. 26, 1995, now abandoned.

BACKGROUND OF THE INVENTION

1. Field of the Invention

This invention relates to powder coatings for cookware and bakeware that result in products having non-stick and/or release characteristics. More specifically, the present invention relates to powder coatings that can be applied to cookware or bakeware that results in dramatic improvement in the non-stick and/or release characteristics of the coated cookware and bakeware substrate. The non-stick and release characteristics of cookware and bakeware, particularly at elevated temperatures are extremely desirable.

The present invention includes a powder coatings having a solid silicone/epoxy resin, and a polysiloxane additive, such as methyl alkyl polysiloxane or dimethyl polysiloxane in combination with or without polytetrafluoroethylene ("PTFE").

Particular features of the present invention include the elimination of using solvent base coatings for cookware, thereby eliminating the problems arising from such liquid coatings. Such problems arising from liquid coatings include the dramatic reduction of volatile organic compounds and all associated problems such as safety and ease in application and disposal of hazardous waste. Thus, the present invention makes it easier for manufacturers to meet the compliance requirements of the U.S. (and the corresponding state) Environmental Protection Agency, as well as meet the requirements of the U.S. FDA.

Moreover, the application of a powder coating is more direct and more of the non-applied coating can be reclaimed and reused for another application than in the application of a liquid coating. It is estimated that application of a powder coating is about 95–98% efficient, while the application of a liquid coatings is about 60–70% efficient. Still further, the amount of energy needed to apply and reclaim a powder coating is less than the energy needed to apply a liquid coating, because there is no need to exhaust solvent fumes and reheat the curing oven. Notably, the base cost of powder coatings is competitive with that of liquid coatings.

A further objective of the present invention is creation of a smooth coating finish that has minimal surface imperfections.

2. Description of the Prior Art

Liquid coatings containing polytetrafluoroethylene ("PTFE") have been used for cookware and bakeware that is typically used at elevated temperatures, i.e.. 250°–900° F. These liquid coatings have been used in order to provide and/or improve non-stick and/or release characteristics of the coated cookware and bakeware substrate. However, as noted above, these liquid coatings present a host of problems. Moreover, prior to the present invention, there were no similarly acceptable powdered coatings for cookware or bakeware that is typically used at elevated temperatures of 250°14 900° F.

Powdered coatings have been used in low temperature applications. For example, powdered coatings have been used as protective coatings for the surfaces of household appliances that are typically only subject to room temperature or slightly above room temperature. However, such powdered coatings would not work for cookware or bakeware that is typically used at elevated temperatures of 250°14 900° F. because these coatings do not have non-stick and/or release characteristics at elevated temperatures.

To the extent that powdered coatings have been used at elevated temperatures, e.g. in fryers or hamburger or waffle makers, those powdered coatings do not provide acceptable non-stick and/or release characteristics in and of themselves as evidenced by the fact that they require some type of lubricant, e.g. butter or vegetable oil, for acceptable results. For example, in bakeware applications where "sugar" release is very important, prior powdered coatings do not provide acceptable non-stick and/or release characteristics. When typical chocolate chip cookies are baked as pursuant to instruction on any commercially available cookie-tray without applying any vegetable oil or similar product, the cookies significantly stick to the tray surface.

SUMMARY OF THE INVENTION

This invention relates to the use of powdered coatings for cookware and bakeware and that results in a coated cookware or bakeware substrate that has non-stick and/or release characteristics. The present invention is a powdered coating that is comprised of a solid silicone resin that is heat resistant and a siloxane additive, with or without PTFE, that provides non-stick and/or release characteristics. In the preferred embodiment of the present invention, the silicone resin is polymethyl phenyl silicone or polyphenyl silicone resin and the siloxane additive is either methyl alkyl polysiloxane or dimethyl polysiloxane. The novel coating composition contains the combination of siloxane additive, with or without PTFE, to achieve release and/or non-stick characteristics at elevated temperatures of 250°–900° F.

DETAILED DESCRIPTION OF THE PREFERRED EMBODIMENTS

EXAMPLE 1

Coating Nos. 1A, 2A, 3A, and 4A listed below are various coatings that have been made according to the teachings of the present invention. The value of each component in each coating is expressed as a percentage of parts per weight of the coating. It is believed that Coating No. 3A is one of the preferred coatings when the coating is used as a coating for cookware or bakeware, e.g. a stove frying pan or baking pans, etc.

Coating Nos. 1B, 2B, 3B and 4B listed below are various coatings that are identical to corresponding Coating Nos. 1A, 2A, 3A and 4A, with the exception that the "B" series coatings do not have a polysiloxane additive as called for in the present invention.

|  | Coatings | | | | | | | |
| --- | --- | --- | --- | --- | --- | --- | --- | --- |
|  | 1A | 1B | 2A | 2B | 3A | 3B | 4A | 4B |
| Component | | | | | | | | |
| ECN 9699 | 32.5 | 32.5 | 20 | 20 | 20 | 20 | 42.5 | 42.5 |
| HT 9690 | 5 | 5 | 3 | 3 | 3 | 3 | 12.5 | 12.5 |
| SY-430 | 10 | 10 | 38.5 | 38.5 | 38.5 | 38.5 | 15 | 15 |
| EPON ® Resin 2002 | 17.5 | 17.5 | 0 | 0 | 0 | 0 | 0 | 0 |
| Modaflow III | 1.2 | 1.2 | 1.0 | 1.0 | 1.0 | 1.0 | 0 | 0 |
| Modarez SPA | 5 | 0 | 5 | 0 | 1.5 | 0 | 5 | 0 |
| Channel Black | 1.5 | 1.5 | 1.5 | 1.5 | 1.2 | 1.2 | 1.2 | 1.2 |
| Micro-Mica C-3000 | 5 | 5 | 5 | 5 | 5 | 5 | 5 | 5 |

-continued

| Coatings | | | | | | | | |
|---|---|---|---|---|---|---|---|---|
| | 1A | 1B | 2A | 2B | 3A | 3B | 4A | 4B |
| Wollastonite 400 | 22.1 | 22.1 | 26 | 26 | 29.8 | 29.8 | 18.8 | 18.8 |
| Znoct 8% | 0.2 | 0.2 | 0 | 0 | 0 | 0 | 0 | 0 |

The polysiloxane additive here is Modarez SPA, made by Synthron of Morganton, N.C. According to the manufacturer, this polysiloxane is dimethyl polysiloxane in powder form and meets the requirements of 21 C.F.R. Section 175.300 for coatings used in direct contact with food. According to the present invention, it is contemplated that other dimethyl polysiloxane additives will provide similar results as Modarez SPA. These other dimethyl polysiloxane additives include commercially available Dow Corning 1-9770 and Dow Corning 200, both of which are made by Dow Corning Corporation of Michigan.

In the above listing, the ECN ("epoxy cresol novolac") 9699 is an epoxy cresol novolac resin made by Ciba-Geigy. According to the manufacturer, this resin is derived from an ortho cresolformaldehyde novolac which is then reacted with epichlorohydrin to form a polyepoxide. In the preferred embodiment, ECN 9699 is about 1 to 50% parts per weight of the coating.

As used herein the polysiloxane additive refers to a group of compounds that are essentially linear polymers which, for example, can be manufactured by hydrolyzing dimethyl dichlorosilane to produce compounds that are further processed by polymerization in the presence of an acid catalyst at ~130° C. Silicone fluids, as the polysiloxane additives are sometimes called, are prevented from extensive polymerization by chain terminators that are well known in the art. To more easily use these additives, they are converted to a powder form which retains the chemical features of the fluids.

As used herein, silicone resins refer to polymers that are normally formed from the hydrolysis of trichlorosilanes and tetrachlorosilanes. Such hydrolysis occurs quite rapidly and the degree of crosslinking can be controlled by a batch processing method in which the hydrolysis is performed in a mixture of water and organic solvent followed by a second step in which excess water is added. Alternatively, alkoxylation can be used to manufacture silicone resins. Silicone resins are networks of primarily trifunctional units arranged irregularly and are more highly branched than polysiloxane additives. Although the term polysiloxane is sometimes used in the context of silicone resins, it well known by those of skill in the art that silicone resins and polysiloxane additives are separate compounds.

The HT 9690 is a o-cresol novalac resin which acts as a curing agent. According to the manufacturer, Ciba-Geigy, this curing agent is an o-cresol novolac resin (hydroxyl-type). In the preferred embodiment, HT 9690 is about 1 to 40% parts per weight of the coating.

The SY-430 is a hydroxy functional solid phenyl silicone resin. Hydroxyl functional methyl phenyl polysiloxane can also be used in place of SY-430. This resin is made by Wacker-Chemie GmbH of Munich, Germany. According to the manufacturer, this product is a solvent-free hydroxyl functional solid phenyl silicone resin delivered in flake form.

EPON® Resin 2002 is made by Shell Chemical Company. According to the manufacturer, this resin is a solid bisphenol-A/epichlorohydrin epoxy resin. The Chemical Abstract Service Registry number for this resin is 25036-25-3. In the preferred embodiment, EPON® Resin 2002 is about 1 to 50% parts per weight of the coating.

Modaflow® Powder III is made by The Chemical Group of Monsanto Company, St. Louis, Mo. This powder is an acrylate copolymer (ethyl acrylate and 2-ethylhexyl acrylate copolymer on silica carrier). According to the manufacturer, this powder is a resin modifier.

Channel Black is simply micropulverized carbon sold by Keystone Aniline Corp. of Chicago, Ill.

According to the distributor (Kraft Chemical Co. of Melrose Park, Ill.), Micro-Mica™ C-3000 is an ultra-fine air micronized functional pigment consisting of pure muscovite mica.

Wollastonite is a naturally occurring calcium metasilicate, i.e. $CaSiO_3$. The particular Wollastonite product used in the above example is made by Nyco of Willsboro, N.Y., and is identified by that company as NYAD® 400 Wollastonite. According to the manufacturer, the deposit of calcium metasilicate came from Nyco's deposit in Lewis, Essex County, N.Y.

Znoct 8% ("zinc octate") is a liquid component which may be used as a catalyst in the curing of silicone resin. The use of this component, if at all, in the present invention is of such a low amount that the fundamental phase of the coating is effectively the same, i.e. a solid powder coating. This component is made by OM Group, Inc., Cleveland Ohio.

All of the above samples were premixed and extruded and the resulting chips were postblended with 0.3% fumed silica (preferably hydrophobic) and 4% PTFE powder before grinding. More specifically, at the premix stage, the raw materials listed above are mixed in a blender at medium to high speed. The premix stage provides a homogenous, dry mixing of the raw materials.

At the extruder stage, the homogenous, dry mix of the raw materials from the premix stage is fed into an extruder (i.e., single or twin screw extruder). The zones of the extruder are heated to temperatures of between 70° to 120° C., with the feed zone being cooled with the cold water circulation. The extruder stage provides the melt mix dispersion of the raw materials. The molten mass out of the extruder is then cooled through squeeze rolls and the flat ribbon of the material is further cooled on a conveyor belt before flaking.

At the postblending stage, flakes from the extruder stage are mixed with fumed silica and PTFE powder at the desired level in the blender at low speed before grinding. The level of postblend varies between 0.1–0.5% of fumed silica to 3–30% of PTFE powder.

At the grinding stage, the postblended flakes are ground by either air classifier mill or jet mill to the desired particle size.

If a "sparkle" appearance is desired in the finished product, then mica or metallic pigments can be dry blended with the powder in the blender at low speed.

For coatings that are in direct contact with food and therefore must meet U.S. FDA requirements, it is believed that the preferred embodiment has a polysiloxane additive in the amount of about 0.5 to 10% parts per weight of the coating. It is further believed that Coating No. 3A with polysiloxane additive in the amount of about 1.5% parts per weight of the coating is the most preferred embodiment. However, it is believed that the amount of polysiloxane additive can be as high as about 15% parts per weight of the coating and still obtain more than acceptable results.

In the preferred embodiment, polytetrafluoroethylene can be added to the coating in an amount from about 3% to about 30% parts per weight of the coating.

The following are additional examples of coatings according to the present invention.

| | Coatings | | | | | | | |
|---|---|---|---|---|---|---|---|---|
| | 5 | 6 | 7 | 8 | 9 | 10 | 11 | 12 |
| Component | | | | | | | | |
| ECN 9699 | 15 | 15 | 47.5 | 47.5 | 47.5 | 47.5 | 50.0 | 47.5 |
| HT-9690 | 7.5 | 7.5 | 17.5 | 10.0 | 17.5 | 17.5 | 12.5 | 17.5 |
| EPON® Resin 2002 | 18.05 | 22.55 | 0 | 0 | 0 | 0 | 0 | 0 |
| SY-430 | 50.0 | 50.0 | 15.0 | 22.5 | 15.0 | 15.0 | 0 | 15.0 |
| Modaflow III | 1.0 | 1.0 | 1.0 | 1.0 | 1.0 | 1.0 | 0 | 1.0 |
| Modarez SPA | 7.0 | 2.5 | 5.0 | 5.0 | 10.0 | 5.0 | 7.0 | 2.0 |
| Channel Black | 1.2 | 1.2 | 1.2 | 1.5 | 1.5 | 1.5 | 1.5 | 1.2 |
| Znoct 8% | 0.25 | 0.25 | 0.2 | 0.25 | 0.25 | 0.25 | 0.25 | 0.2 |
| Wollastonite-400 | 0 | 0 | 12.6 | 12.25 | 7.25 | 0 | 8.75 | 15.6 |
| PTFE | 0 | 0 | 0 | 0 | 0 | 12.25 | 0 | 0 |
| Dow Corning® 6-2230 Resin | 0 | 0 | 0 | 0 | 0 | 0 | 20.0 | 0 |

Dow Corning® 6-2230 Resin is made by Dow Corning Corporation. According to the manufacturer, this resin is a 100 percent silicone, hydroxyl functional resin supplied as a flaked solid, and may be described as a methylphenyl polysiloxane. Further according to the manufacturer, this resin falls within the description "Siloxane resins originating from methyl hydrogen polysiloxane" set forth in Section (b) (xxvii) of 21 CFR 175.300.

All of the above samples were premixed and extruded and the resulting chips were postblended with 0.3% fumed silica (preferably hydrophobic) and 4% PTFE powder before grinding. More specifically, at the premix stage, the raw materials listed above are mixed in a blender at medium to high speed. The premix stage provides a homogenous, dry mixing of the raw materials.

At the extruder stage, the homogenous, dry mix of the raw materials from the premix stage is fed into an extruder (i.e., single or twin screw extruder). The zones of the extruder are heated to temperatures of between 70° to 120° C., with the feed zone being cooled with the cold water circulation. The extruder stage provides the melt mix dispersion of the raw materials. The molten mass out of the extruder is then cooled through squeeze rolls and the flat ribbon of the material is further cooled on a conveyor belt before flaking.

At the postblending stage, flakes from the extruder stage are mixed with fumed silica and PTFE powder at the desired level in the blender at low speed before grinding. The level of postblend varies between 0.1–0.5% of fumed silica to 3–30% of PTFE powder.

At the grinding stage, the postblended flakes are ground by either jet mill or air classifier mill to the desired particle size.

If a "sparkle" appearance is desired in the finished product, then mica or metallic pigments can be dry blended with the powder in the blender at low speed.

EXAMPLE 2

The Coating Nos. 1A, 1B, 2A, 2B, 3A, 3B, 4A and 4B and 5–12 above were tested for non-stick and release characteristics. An aluminum panel was coated with 1–2 millimeters of Coating No. 1A. The coated aluminum panel was placed on a standard hot plate and heated to 350° F. An egg white was placed on the coated aluminum panel, and after 3 minutes the egg white was then allowed to slide off of the coated aluminum panel. There was no sign of sticking or staining. A nickel was then rubbed with moderate pressure back and forth for 100 times on the coated aluminum panel. There was no sign of the coating coming off of the coated aluminum panel. These tests were repeated for Coatings Nos. 2A, 3A, 4A and 5–12, with similar results.

However, when these same tests were done for Coating Nos. 1B, 2B, 3B and 4B, all of which do not have a polysiloxane additive, the egg did not easily slide off of the coated aluminum panel, and there were signs of sticking and staining. The side-by-side comparison between Coating Nos. 1A and 1B, 2A and 2B, 3A and 3B, 4A and 4B, demonstrate that the present invention having a polysiloxane additive provides significantly better non-stick and release characteristics over coatings that do not have a polysiloxane additive. In view of this side-by-side comparison, those of skill in the art will recognize that the addition of a polysiloxane additive, according to the present invention, provides significant benefits.

EXAMPLE 3

The following coatings were also made and tested like Coating Nos. 1–12 as set forth in Examples 1 and 2. Coating No. 14 had better release and non-stick characteristics than Coating No. 13.

| | Coatings | |
|---|---|---|
| Component | 13 | 14 |
| ECN-9699 | 15 | 15 |
| HT-9690 | 7.5 | 7.5 |
| EPON® Resin 2002 | 18.05 | 22.55 |
| SY-430 | 50.0 | 50.0 |
| Modaflow III | 1.0 | 1.0 |
| Modarez SPA | 7.0 | 2.5 |
| Channel Black | 1.2 | 1.2 |
| Znoct 8% | 0.25 | 0.25 |

EXAMPLE 4

The following Coatings were made and tested like Coating Nos. 1–12 as set forth in Examples 1 and 2. Coating Nos. 15–20 all exhibited good release and non-stick characteristics. Coating No. 20 exhibited the best release and non-stick characteristics of this group, Coating Nos. 15–20.

| | Coatings | | | | | |
|---|---|---|---|---|---|---|
| Component | 15 | 16 | 17 | 18 | 19 | 20 |
| ECN-9699 | 47.5 | 47.5 | 47.5 | 47.5 | 50.0 | 47.5 |
| HT-9690 | 17.5 | 10.0 | 17.5 | 17.5 | 12.5 | 17.5 |
| SY-430 | 15.0 | 22.5 | 15.0 | 15.0 | 0 | 15.0 |
| Dow Corning® 6-2230 Resin | 0 | 0 | 0 | 0 | 20 | 0 |
| Modaflow III | 1.0 | 1.0 | 1.0 | 1.0 | 0 | 1.0 |
| Modarez SPA | 5.0 | 5.0 | 10.0 | 5.0 | 7.0 | 2.0 |
| Channel Black | 1.2 | 1.5 | 1.5 | 1.5 | 1.5 | 1.2 |
| Znoct 8% | 0.2 | 0.25 | 0.25 | 0.25 | 0.25 | 0.2 |
| Wollastonite 400 | 12.6 | 12.25 | 7.25 | 0 | 8.75 | 15.6 |
| PTFE | 0 | 0 | 0 | 12.25 | 0 | 0 |

EXAMPLE 5

The following coatings were made and tested like Coating Nos. 1–12 as set forth in Examples 1 and 2. Coating No. 23 exhibited the best release and non-stick characteristics of this group, Coating Nos. 21–24.

| Component | Coatings | | | |
|---|---|---|---|---|
| | 21 | 22 | 23 | 24 |
| ECN-9699 | 32.5 | 20.0 | 20.0 | 42.5 |
| HT-9690 | 5.0 | 3.0 | 3.0 | 12.5 |
| SY-430 | 10 | 38.5 | 38.5 | 15.0 |
| Modaflow III | 1.2 | 1.0 | 1.0 | 0 |
| EPON ® Resin 2002 | 17.5 | 0 | 0 | 0 |
| Modarez SPA | 5.0 | 5.0 | 1.5 | 5.0 |
| Channel Black | 1.5 | 1.5 | 1.2 | 1.2 |
| Micro-Mica C-3000 | 5.0 | 5.0 | 5.0 | 5.0 |
| Wollastonite 400 | 22.1 | 26 | 29.8 | 18.8 |
| Znoct 8% | 0.2 | 0 | 0 | 0 |

EXAMPLE 6

Below is a listing of various coatings Nos. 25 through 29 that have been made according to the teachings of the present invention. The value of each component in each coating is expressed as a percentage of parts per weight of the coating. It is believed that Coating No. 28 is the preferred coating when the coating is used as a coating for cookware that is not in direct contact with food, e.g. an oven drip pan, and therefore need not meet the requirements of the U.S. FDA.

| Component | Coatings | | | | |
|---|---|---|---|---|---|
| | 25 | 26 | 27 | 28 | 29 |
| ECN 9699 | 4.5 | 4.5 | 10.0 | 10.0 | 10.0 |
| HT 9690 | 1.5 | 1.5 | 1.5 | 1.5 | 1.5 |
| SY-430 | 55 | 55 | 50 | 50 | 50.0 |
| Modaflow III | 1.0 | 1.0 | 1.0 | 1.0 | 1.0 |
| Ferro F-6331 | 4.0 | 4.0 | 4.0 | 4.0 | 4.0 |
| Zeospheres 200 | 12.5 | 12.5 | 0 | 0 | 0 |
| Micro-Mica C-3000 | 5.0 | 5.0 | 5.0 | 5.0 | 5.0 |
| Modarez S1-21-91 | 5.0 | 0 | 7.5 | 0 | 0 |
| Modarez MSL | 0 | 5.0 | 0 | 5.0 | 2.5 |
| Wollastonite 400 | 11.5 | 11.5 | 21.0 | 23.5 | 26.0 |

The polysiloxane additive here is Modarez MSL, made by Synthron of Morganton, N.C. According to the manufacturer, this polysiloxane is powder version of a methyl alkyl polysiloxane.

In the above listing, the ECN ("epoxy cresol novolac") 9699 is an epoxy cresol novalac resin made by Ciba-Geigy. According to the manufacturer, this novolac epoxy resin is derived from an ortho cresolformaldehyde novolac which is then reacted with epichlorohydrin to form a polyepoxide.

The HT 9690 is a curing agent made by Ciba-Geigy. According to the manufacturer, this curing agent is an o-cresol novolac resin (hydroxyl-type).

The SY-430 is a resin is made by Wacker-Chemie GmbH of Munich, Germany. According to the manufacturer, this product is a solvent-free hydroxyl functional solid phenyl silicone resin delivered in flake form. Hydroxyl functional methyl phenyl polysiloxane can be used in place of SY-430.

Modaflow® Powder III is made by the Chemical Group of Monsanto Company, St. Louis, Mo. This powder is an acrylate copolymer. According to the manufacturer, this powder is a resin modifier.

Ferro F-6331 is made by Ferro Corporation, Cleveland Ohio. It is a high temperature calcination of coprecipitated compound with manganese-copper-iron. According to the manufacturer, F-6331 is a black inorganic pigment. The CAS Number is 68186-94-7.

Zeospheres 200 is made by Zeelan Industries, Inc., St. Paul, Minn. According to the manufacturer this component is a silica-alumina alloy in the shape of hollow walls with thick walls.

According to the distributor (Kraft Chemical Co. of Melrose Park, Ill.), Micro-Mica® C-3000 is an ultra-fine air micronized functional pigment consisting of pure muscovite mica.

Moclarez SI-21-91 is made by Synthron, Inc., Morganton, N.C. According to the manufacturer, this component is a 65% active powder of a polysiloxane/polyether copolymer additive for powder coatings.

Modarez MSL is made by Synthron, Inc., Morganton, N.C. According to the manufacturer, this component is a 60% active powder version of the methyl alkyl polysiloxane for powder coatings.

Wollastonite is a naturally occurring calcium metasilicate, i.e. $CaSiO_3$. The particular Wollastonite product used in the above example is made by Nyco of Willsboro, N.Y., and is identified by that company as NYAD®400 Wollastonite. According to the manufacturer, the deposit of calcium metasilicate came from Nyco's deposit in Lewis, Essex County, N.Y.

All of the above samples were premixed and extruded and the resulting chips were postblended with 0.3% fumed silica (preferably hydrophobic) before grinding. More specifically, at the premix stage, the raw materials listed above are mixed in a blender at medium to high speed. The premix stage provides a homogenous, dry mixing of the raw materials.

At the extruder stage, the homogenous, dry mix of the raw materials from the premix stage is fed into an extruder (i.e., single or twin screw extruder). The zones of the extruder are heated to temperatures of between 70° to 120° C., with the feed zone being cooled with the cold water circulation. The extruder stage provides the melt mix dispersion of the raw materials. The molten mass out of the extruder is then cooled through squeeze rolls and the flat ribbon of the material is further cooled on a conveyor belt before flaking.

At the postblending stage, flakes from the extruder stage are mixed with fumed silica at the desired level in the blender at low speed before grinding. The level of postblend varies between 0.1–0.5% of fumed silica.

At the grinding stage, the postblended flakes are ground by either jet mill or air classifier mill to the desired particle size.

If a "sparkle" appearance is desired in the finished product, then mica or metallic pigments can be dry blended with the powder in the blender at low speed.

EXAMPLE 7

The Coating Nos. 25–29 above were tested for release and non-stick characteristics. First a drip tray was coated with a film thickness of about 1–2 millimeters of Coating No. 28. The coated drip tray was then placed on a gas or electric burner.

Then a small sample of orange juice and tomato ketchup was placed on the coated drip tray and the gas or electric burner was turned on "high" for 30 minutes. The coated drip tray was then allowed to cool down to room temperature, and the orange juice and tomato ketchup samples were then slid off of the coated drip pan with no signs of sticking. This test was then repeated for Coating Nos. 25–27 and 29. Coating No. 28 exhibited the best release and non-stick characteristics of this group. Coating Nos. 25 and 27, which include a copolymer of polysiloxane\polyether, did not exhibit good release or non-stick characteristics.

EXAMPLE 8

The following coatings were made and tested like Coating Nos. 25-29 as set forth in Examples 6 and 7. Coating No. 32 exhibited the best release and non-stick characteristics of this group, Coating Nos. 30-32.

|                   | Coatings |      |      |
|-------------------|----------|------|------|
| Component         | 30       | 31   | 32   |
| ECN-9699          | 4.5      | 10.0 | 10.0 |
| HT-9690           | 1.5      | 1.5  | 1.5  |
| SY-430            | 55.0     | 55.0 | 50.0 |
| Modaflow III      | 1.0      | 1.0  | 1.0  |
| F-6331            | 4.0      | 4.0  | 4.0  |
| Zeospheres 200    | 12.5     | 0    | 0    |
| Micro-Mica C-3000 | 5.0      | 5.0  | 5.0  |
| Modarez S1-21-91  | 0        | 0    | 0    |
| Modarez MSL       | 5.0      | 5.0  | 5.0  |
| Wollastonite 400  | 11.5     | 23.5 | 26.0 |

EXAMPLE 9 the following coatings were made and tested like Coating Nos. 25-32 as set forth in Examples 6, 7 and 8.

|                   | Coatings |      |
|-------------------|----------|------|
| Component         | 33       | 34   |
| MK Resin          | 50.0     | 0.0  |
| REN-100           | 0.0      | 50.0 |
| ECN-9699          | 10.0     | 10.0 |
| HT-9690           | 1.5      | 1.5  |
| Modaflow III      | 1.0      | 1.0  |
| F-6331            | 4.0      | 4.0  |
| Micro-Mica C-3000 | 5.0      | 5.0  |
| Modarez MSL       | 5.0      | 5.0  |
| Wollastonite 400  | 23.5     | 23.5 |

MK Resin is made by Wacker-Chemie GmbH, Munich, Germany. According to the manufacturer, this component is pure methyl polysiloxane resin which comes as a solvent-free solid.

REN-100 is made by Wacker-Chemie GmbH, Munich, Germany. According to the manufacturer, this component is phenyl alkyl polysiloxane resin that exhibits good corrosion resistance and heat resistance up to 650° C.

Both Coating Nos. 33 and 34 have a different gloss level and degree of cure than the previous coatings with SY-430 and 6-2230 resins. Coating Nos. 33 and 34 have slightly reduced release characteristics as compared to those containing the SY-430 and 6-2230 resins. Coating No. 34 is preferred to Coating No. 33.

The foregoing embodiments of the present invention demonstrate that there are alternative amounts of silicone resin and the polysiloxane additive. These amounts of silicone resin and polysiloxane additive may vary depending on the application and will be recognized by those skilled in the art.

The foregoing detailed description of the invention has been made in general terms and with respect to several preferred embodiments. Many of the preferred embodiments stated herein may be varied by persons skilled in the art without departing from the spirit and scope of the present invention as set forth in the following claims and equivalents.

What is claimed is:

1. A powder coating for cookware and bakeware comprising a powder silicone resin selected from the group consisting of phenyl polysiloxane powder resin, methyl polysiloxane powder resin and phenyl alkyl polysiloxane powder resin, and a polysiloxane additive selected from the group consisting of dimethyl polysiloxane and methyl alkyl polysiloxane, wherein the powder coating is characterized by heat stability from about 250° F. to about 900° F. and non-stick and release properties.

2. The powder coating of claim 1 wherein the polysiloxane additive is between about 0.5% to about 10% parts per weight of the powder coating.

3. The powder coating of claim 1 wherein the silicone resin is from about 5 to 75% parts per weight of the powder coating.

4. The powder coating of claim 1 wherein polytetrafluoroethylene is included in the powder coating.

5. The powder coating of claim 4 wherein the polytetrafloroethylene is from about 3% to about 30% parts per weight of the powder coating.

6. The powder coating of claim 1 wherein epoxy cresol novolac is included in the powder coating.

7. The powder coating of claim 6 wherein the epoxy cresol novolac is from about 1 to about 50% parts per weight of the powder coating.

8. The powder coating of claim 6 wherein o-cresol novolac is included in the powder coating.

9. The powder coating of claim 8 wherein the o-cresol novolac is from about 1 to about 40% parts per weight of the powder coating.

10. The powder coating of claim 1 wherein a solid bisphenol-A/epichlorohydrin epoxy resin is included in the powder coating.

11. The powder coating of claim 10 wherein the solid bisphenol-A/epichlorohydrin epoxy resin is from about 1 to about 50% parts per weight of the powder coating.

12. A metal substrate coated with the powder coating of claim 1.

13. A metal substrate coated with the powder coating of claim 4.

14. A metal substrate coated with the powder coating of claim 6.

15. A metal substrate coated with the powder coating of claim 8.

16. A metal substrate coated with the powder coating of claim 10.

* * * * *